US012681595B2

(12) United States Patent
Chen et al.

(10) Patent No.: US 12,681,595 B2
(45) Date of Patent: Jul. 14, 2026

(54) ELECTRONIC DEVICE DISPLAY WITH ARRAY OF DISCRETE LIGHT-EMITTING DIODES

(71) Applicant: Apple Inc., Cupertino, CA (US)

(72) Inventors: Wei Chen, Los Altos Hills, CA (US); Steven P. Hotelling, Santa Cruz, CA (US); John Z. Zhong, Saratoga, CA (US); William C. Athas, San Jose, CA (US); Wei H. Yao, Saratoga, CA (US)

( * ) Notice: Subject to any disclaimer, the term of this patent is extended or adjusted under 35 U.S.C. 154(b) by 0 days.

(21) Appl. No.: 19/048,055

(22) Filed: Feb. 7, 2025

(65) Prior Publication Data

US 2025/0181182 A1     Jun. 5, 2025

Related U.S. Application Data

(63) Continuation of application No. 18/306,080, filed on Apr. 24, 2023, now Pat. No. 12,254,147, which is a continuation of application No. 16/936,245, filed on Jul. 22, 2020, now Pat. No. 11,669,178, which is a
(Continued)

(51) Int. Cl.
| | |
|---|---|
| *G06F 3/041* | (2006.01) |
| *G06F 3/044* | (2006.01) |
| *G06V 40/13* | (2022.01) |
| *G09G 3/00* | (2006.01) |
(Continued)

(52) U.S. Cl.
CPC ........ *G06F 3/0412* (2013.01); *G06F 3/04164* (2019.05); *G06F 3/044* (2013.01); *G06F 3/0443* (2019.05); *G06V 40/1306* (2022.01);

*G06V 40/1318* (2022.01); *G09G 3/03* (2020.08); *G09G 3/32* (2013.01); *H04N 9/30* (2013.01); *G06F 2203/04102* (2013.01); *G09G 2360/14* (2013.01)

(58) Field of Classification Search
CPC .... G06F 3/0412; G06F 3/04164; G06F 3/044; G06F 3/0443; G06F 2203/04102; G06V 40/1306; G06V 40/1318; G09G 3/03; G09G 3/32; G09G 2360/14; H04N 9/30
See application file for complete search history.

(56) References Cited

U.S. PATENT DOCUMENTS

| | | | |
|---|---|---|---|
| 10,739,882 | B2 | 8/2020 | Chen et al. |
| 11,669,178 | B2 | 6/2023 | Chen et al. |
(Continued)

*Primary Examiner* — Premal R Patel
(74) *Attorney, Agent, or Firm* — Treyz Law Group, P.C.; Kendall P. Woodruff

(57) ABSTRACT

An electronic device may include a display. The display may be formed by an array of light-emitting diodes mounted to the surface of a substrate. The substrate may be a silicon substrate. Circuitry may be located in spaces between the light-emitting diodes. Circuitry may also be located on the rear surface of the silicon substrate and may be coupled to the array of light-emitting diodes using through-silicon vias. The circuitry may include integrated circuits and other components that are attached to the substrate and may include transistors and other circuitry formed within the silicon substrate. Touch sensor electrodes, light sensors, and other components may be located in the spaces between the light-emitting diodes. The substrate may be formed from a transparent material that allows image light to reach a lens and image sensor mounted below the substrate.

20 Claims, 17 Drawing Sheets

Related U.S. Application Data continuation of application No. 14/453,574, filed on Aug. 6, 2014, now Pat. No. 10,739,882.

(51) Int. Cl.
  G09G 3/32 (2016.01)
  H04N 9/30 (2006.01)

(56) References Cited

U.S. PATENT DOCUMENTS

| | | | | |
|---|---|---|---|---|
| 2008/0106629 | A1* | 5/2008 | Kurtz | H04N 7/144 |
| | | | | 348/E5.022 |
| 2011/0134144 | A1* | 6/2011 | Moriwaki | G09G 3/035 |
| | | | | 345/660 |
| 2011/0255850 | A1* | 10/2011 | Dinh | G03B 15/03 |
| | | | | 396/176 |
| 2012/0262643 | A1* | 10/2012 | Kweon | G02B 6/0073 |
| | | | | 362/249.02 |
| 2012/0320581 | A1* | 12/2012 | Rogers | H01L 24/82 |
| | | | | 257/E33.059 |
| 2013/0194199 | A1* | 8/2013 | Lynch | G09G 3/3208 |
| | | | | 445/24 |
| 2013/0271384 | A1* | 10/2013 | Chuang | G06F 3/0446 |
| | | | | 345/173 |
| 2023/0259226 | A1 | 8/2023 | Chen et al. | |

* cited by examiner

ELECTRONIC DEVICE DISPLAY WITH ARRAY OF DISCRETE LIGHT-EMITTING DIODES

This patent application is a continuation of U.S. patent application Ser. No. 18/306,080, filed Apr. 24, 2023, which is a continuation of U.S. patent application Ser. No. 16/936, 245, filed Jul. 22, 2020, now U.S. Pat. No. 11,669,178, which is a continuation of U.S. patent application Ser. No. 14/453,574, filed Aug. 6, 2014, now U.S. Pat. No. 10,739, 882, all of which are hereby incorporated by reference herein in their entireties.

BACKGROUND

This relates generally to electronic devices and, more particularly, to electronic devices with displays.

Electronic devices often include displays. For example, an electronic device may have a liquid crystal display in which an array of liquid crystal display pixels is used to display images for a user. Liquid crystal displays often include light-emitting diode backlight units for providing backlight illumination. Display efficiency can be adversely affected by inefficiencies in producing backlight illumination and in transmitting backlight illumination through liquid crystal display structures. Liquid crystal display structures also exhibit limited contrast ratios. Organic light-emitting diode displays have been developed that exhibit high contrast ratios, but these devices may consume more power than desired due to the inefficiencies in their organic light-emitting diodes.

It would therefore be desirable to be able to provide electronic devices with improved displays.

SUMMARY

An electronic device may include a display. The display may be formed by an array of light-emitting diodes mounted to the surface of a substrate. The light-emitting didoes may be discrete crystalline semiconductor light-emitting diodes. The substrate may be a semiconductor substrate such as a silicon substrate or may be a transparent substrate such as a layer of clear glass or plastic.

Circuitry may be located in spaces between the light-emitting diodes. Circuitry may also be located on the rear surface of the substrate and may be coupled to the array of light-emitting diodes using vias. The circuitry may include integrated circuits and other components that are attached to the substrate and may include transistors and other circuitry formed within a silicon substrate. Touch sensor electrodes, light sensors, and other components may be located in the spaces between the light-emitting diodes.

In configurations in which the substrate is formed from a transparent material, an image sensor and lens may be placed below the substrate. This allows the image sensor to capture images using image light that passes through the transparent substrate and the lens.

DETAILED DESCRIPTION

Figure 1:
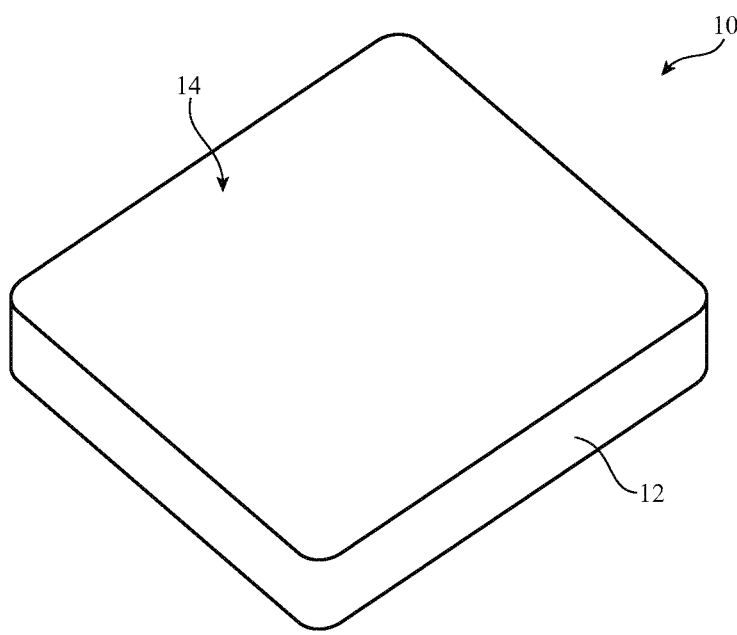
FIG. 1 is a perspective view of an illustrative electronic device having a display in accordance with an embodiment.

An illustrative electronic device of the type that may be provided with a display is shown in FIG. 1. An electronic device such as electronic device 10 of FIG. 1 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a display for video, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. The configuration of device 10 that is shown in FIG. 1 (e.g., a portable device configuration in which device 10 is a cellular telephone, media player, wrist device, tablet computer, or other portable computing device) is shown as an example. Other configurations may be used for device 10 if desired.

Device 10 may have one or more displays such as display 14 mounted in housing structures such as housing 12. Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components. Touch sensor electrodes may be used to capture touch input from a user's finger or a stylus and/or may be used to gather fingerprint data.

Display 14 may include an array of display pixels that emit light such as an array of light-emitting diode display pixels. In general, display 14 may use liquid crystal display technology, light-emitting diode display technology such as organic light-emitting diode display technology, plasma display technology, electrophoretic display technology, electrowetting display technology, or other types of display technology. Configurations in which display 14 is based on an array of light-emitting diodes are sometimes described herein as an example. This is, however, merely illustrative. Other types of display technology may be incorporated into device 10 if desired.

Figure 2:
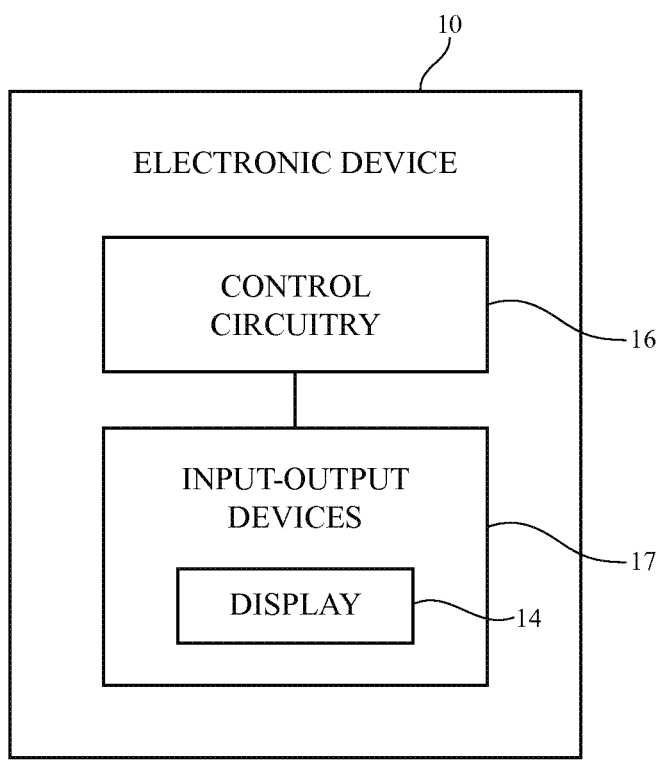
FIG. 2 is a schematic diagram of an illustrative electronic device having a display in accordance with an embodiment.

A schematic diagram of an electronic device such as electronic device 10 of FIG. 1 is shown in FIG. 2. As shown in FIG. 2, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio codec chips, application specific integrated circuits, etc.

Input-output circuitry in device 10 such as input-output devices 17 may be used to allow data to be supplied to device 10 and to allow data to be provided from device 10 to external devices. Input-output devices 17 may include buttons, joysticks, click wheels, scrolling wheels, touch pads, fingerprint sensors, key pads, keyboards, microphones, speakers, tone generators, vibrators, cameras, sensors, light-emitting diodes and other status indicators, data ports, etc. A user can control the operation of device 10 by supplying commands through input-output devices 17 and may receive status information and other output from device 10 using the output resources of input-output devices 17. Input-output devices 17 may include one or more displays such as display 14.

Control circuitry 16 may be used to run software on device 10 such as operating system code and applications. During operation of device 10, the software running on control circuitry 16 may display images on display 14 in input-output devices.

Figure 3:
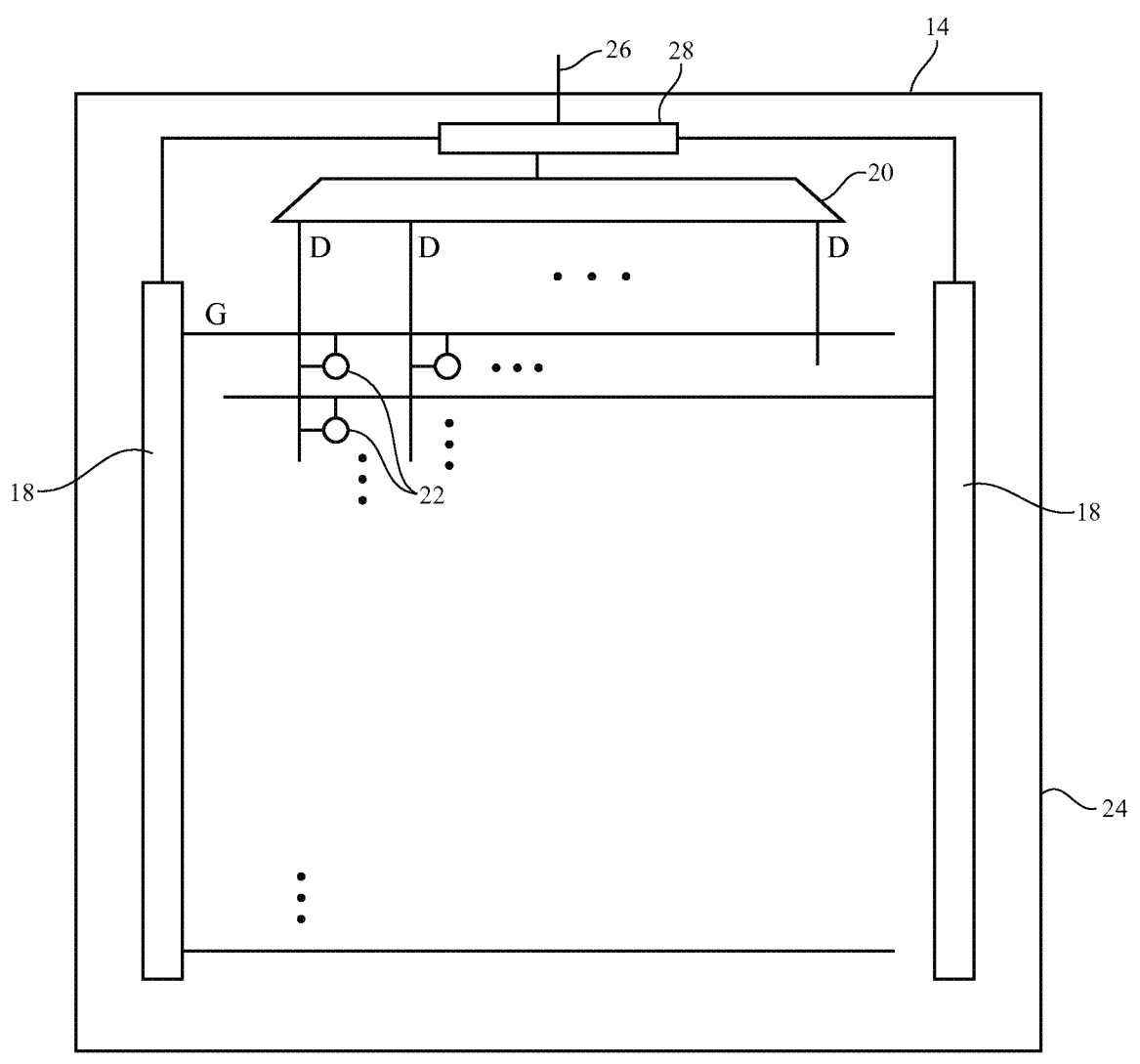
FIG. 3 is a diagram of an illustrative display in accordance with an embodiment.

As shown in the illustrative diagram of FIG. 3, display 14 may include layers such as substrate layer 24. Layers such as substrate 24 may be formed from layers of material such as glass layers, polymer layers, composite films that include polymer and inorganic materials, metallic foils, semiconductors such as silicon or other semiconductor materials, layers of material such as sapphire (e.g., crystalline transparent layers, ceramics, etc.), or other material. Substrate 24 may be planar or may have other shapes (e.g., concave shapes, convex shapes, shapes with planar and curved surface regions, etc.). The outline of substrate 24 may be circular, oval, rectangular, square, may have a combination of straight and curved edges, or may have other suitable shapes. As shown in the rectangular substrate example of FIG. 3, substrate 24 may have left and right vertical edges and upper and lower horizontal edges.

Display 14 may have an array of display pixels 22 for displaying images for a user. The array of display pixels 22 may be formed from rows and columns of display pixel structures (e.g., display pixels formed from structures on display layers such as substrate 24). The array may have a rectangular outline or may have an outline of other suitable shapes. There may be any suitable number of rows and columns in the array of display pixels 22 (e.g., ten or more, one hundred or more, or one thousand or more). Each display pixel may be formed from a light-emitting component such as a light-emitting diode.

Display driver circuitry such as display driver circuitry 28 may be coupled to conductive paths such as metal traces on substrate 24 using solder or conductive adhesive. Display driver circuitry may contain communications circuitry for communicating with system control circuitry over path 26. Path 26 may be formed from traces on a flexible printed circuit or other cable or may be formed using other signal path structures in device 10. The control circuitry may be located on a main logic board in an electronic device in which display 14 is being used. During operation, the control circuitry on the logic board (e.g., control circuitry 16 of FIG. 1) may supply control circuitry such as display driver circuitry 28 with information on images to be displayed on display 14.

To display the images on display pixels 22, display driver integrated circuit 28 may supply corresponding image data to data lines D (sometimes referred to as source lines) while issuing clock signals and other control signals to supporting display driver circuitry such as gate driver circuitry 18 and demultiplexing circuitry 20.

Gate driver circuitry 18 (sometimes referred to as scan line driver circuitry) may be formed on substrate 24 (e.g., on the left and right edges of display 14, on only a single edge of display 14, or elsewhere in display 14). Demultiplexer circuitry 20 may be used to demultiplex data signals from display driver integrated circuit 16 onto a plurality of corresponding data lines D.

Display control circuitry such as circuitry 18, 20, and 28 may be implemented using one or more integrated circuits (e.g., display driver integrated circuits such as timing controller integrated circuits and associated source driver circuits and/or gate driver circuits), may be implemented using thin-film transistor circuitry implemented on substrate 24, and/or may be implemented using circuitry formed within substrate 24 (e.g., in a configuration in which substrate 24 is formed from a semiconductor substrate such as a silicon substrate).

With the illustrative arrangement of FIG. 3, data lines (source lines) D run vertically through display 14. Data lines D are associated with respective columns of display pixels 22. Display pixels 22 may include light-emitting diodes of different colors (e.g., red, green, blue). Corresponding data lines D may be used to carry red, green, and blue data.

Gate lines G (sometimes referred to as scan lines) run horizontally through display 14. Each gate line G is associated with a respective row of display pixels 22. If desired, there may be multiple horizontal control lines such as gate lines G associated with each row of display pixels. Gate driver circuitry 18 may be located on the left side of display 14, on the right side of display 14, or on both the right and left sides of display 14, as shown in FIG. 2. Gate driver circuitry 18 and the other display control circuitry for display 14 may also be placed elsewhere in display 14, if desired.

Gate driver circuitry 18 may assert horizontal control signals (sometimes referred to as scan signals or gate signals) on the gate lines G in display 14. For example, gate driver circuitry 18 may receive clock signals and other control signals from display driver circuitry 28 and may, in response to the received signals, assert a gate signal on gate lines G in sequence, starting with the gate line signal G in the first row of display pixels 22. As each gate line is asserted, data from data lines D is located into the corresponding row of display pixels. In this way, circuitry 28, 20, and 18 may provide display pixels 22 with signals that direct display pixels 22 to generate light for displaying a desired image on display 14. More complex control schemes may be used to control display pixels with multiple associated control transistors (e.g., to implement threshold voltage compensation schemes) if desired.

Display pixels 22 may be formed from individual (discrete) light-emitting diode structures (i.e., small crystalline semiconductor die). For example, each display pixel 22 may be formed from a respective red, blue, or green light-emitting diode. If desired, phosphorescent materials may be incorporated into pixels 22 (e.g., to convert blue light from a diode into red or green light, etc.). Each light-emitting diode may be formed from a separate crystalline semiconductor device. Examples of semiconductors that may be used in forming discrete light-emitting diodes for display pixels 22 include III-V compounds such as GaN or GaP, II-VI compounds such as ZnSe, and other compounds such as AlGaInP. The discrete light-emitting diodes may include quantum well structures, quantum wires, or quantum dots. The active layer(s) of the diodes may have thicknesses of 0.5-5 microns (as an example). Display pixel diodes may be oriented vertically or horizontally. For example, diodes for display pixels 22 may have cathodes and anodes that are aligned above each other (i.e., the cathode may be formed on top of a display pixel light-emitting diode and the anode may be formed on the bottom of the display pixel light-emitting diode or vice versa). Configurations in which the terminals for the diodes are spaced laterally (parallel to the surface of the substrate) may also be used.

Figure 4:
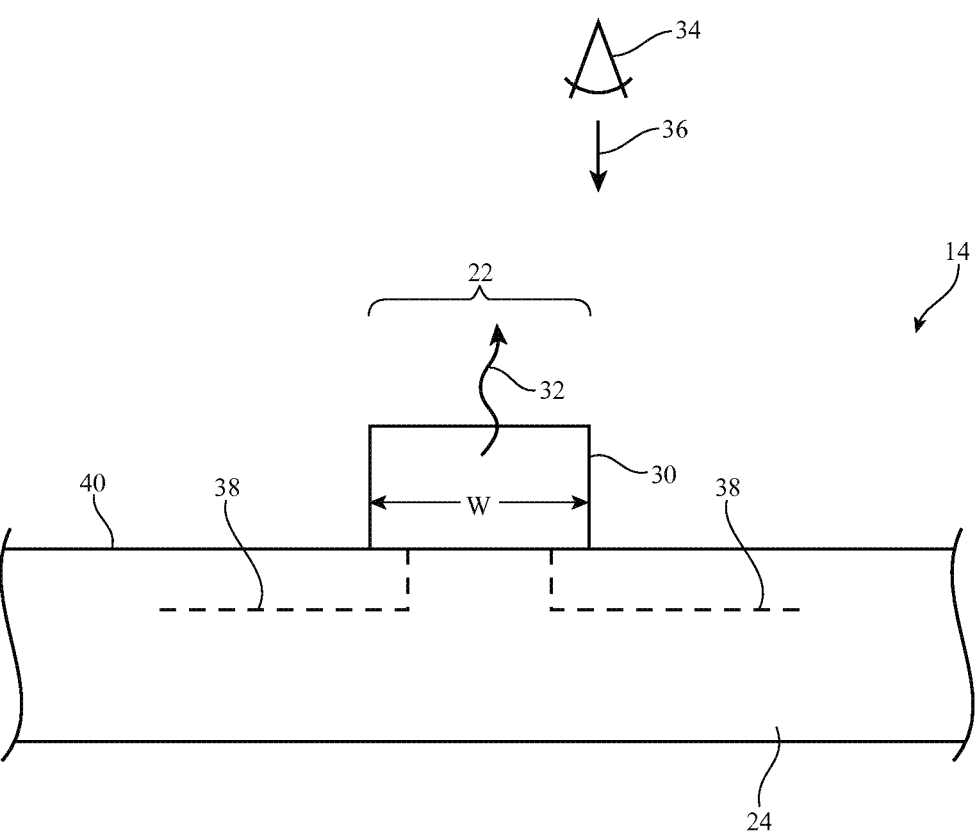
FIG. 4 is a cross-sectional side view of a portion of a display having discrete light-emitting diodes attached to a substrate in accordance with an embodiment.

A cross-sectional side view of an illustrative display pixel 22 that is based on a light-emitting diode is shown in FIG. 4. As shown in FIG. 4, display pixel 22 may include light-emitting diode 30 for emitting light 32 upwards out of display 14. A viewer such as viewer 34 who is viewing display 14 in direction 36 may view images on display 14 that are formed from light 32 from an array of display pixels 22. The array may include display pixels 22 of different colors (i.e., light-emitting diodes of different colors such as red, blue, and green light-emitting diodes that respectively emit red, blue, and green light).

Light-emitting diodes 30 may be mounted on surface 40 of substrate 24. Bonding materials such as conductive bonding materials (e.g., bonding materials formed from solder, semiconductors, metals, polymers, other materials and/or combinations of these materials) may be used in attaching each discrete light-emitting diode 30 to substrate 24. Light-emitting diodes 30 may be partially or completely free of polymer packaging so that the overall size of light-emitting diodes 30 is minimized. The lateral size W of light-emitting diodes 30 may be about 1-500 microns, 2-50 microns, 5-30 microns, less than 30 microns, 3-7 microns, more than 2 microns, or other suitable size. The height H of light-emitting diodes 30 may be less than 100 microns, less than 10 microns, less than 2 microns, less than 1 micron, or more than 1 micron (as examples). Light-emitting diodes 30 may be spaced apart from each other by a spacing of about 5-100 microns, 10-75 microns, a distance of 20-50 microns, a distance of greater than 10 microns, or a distance of less than 100 microns (as examples).

Substrate 24 may contain interconnects (metal traces) formed from patterned metal lines, metal vias, and other conductive signal paths. As shown schematically in FIG. 4, signal paths 38 supported by substrate 24 may be coupled to light-emitting diodes 30 so that current can be driven through light-emitting diodes 30 to cause diodes 30 to emit light 32.

Substrate 24 may be formed from a dielectric material such as plastic, glass, ceramic, or other materials (e.g., clear plastic, clear glass, clear ceramic, etc.), may be formed from conductive materials (e.g., metal), may be formed from a semiconductor (e.g., silicon or a compound semiconductor), may be formed from other materials, or a combination of these materials.

Figure 5:
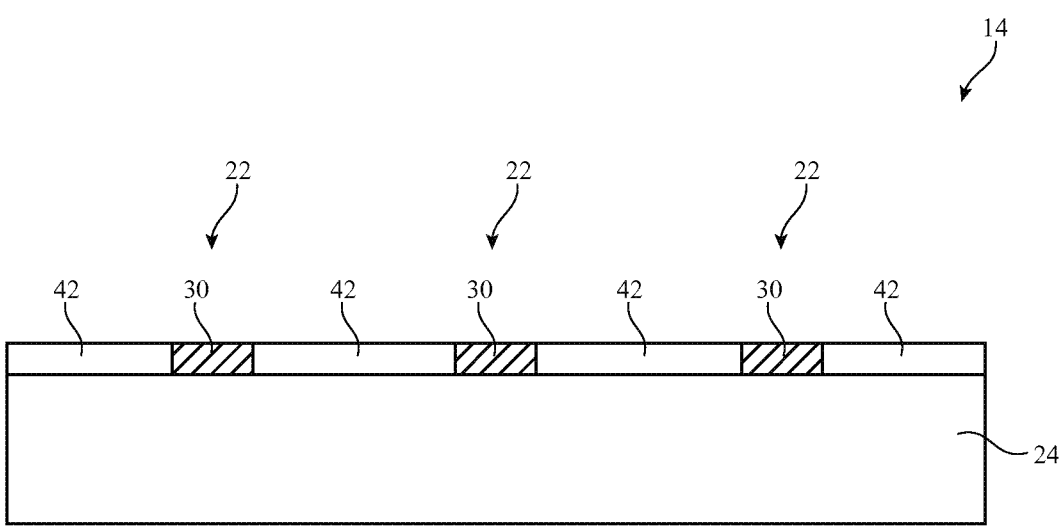
FIG. 5 is a cross-sectional side view of a display having an array of discrete light-emitting diodes in accordance with an embodiment.
Figure 6:
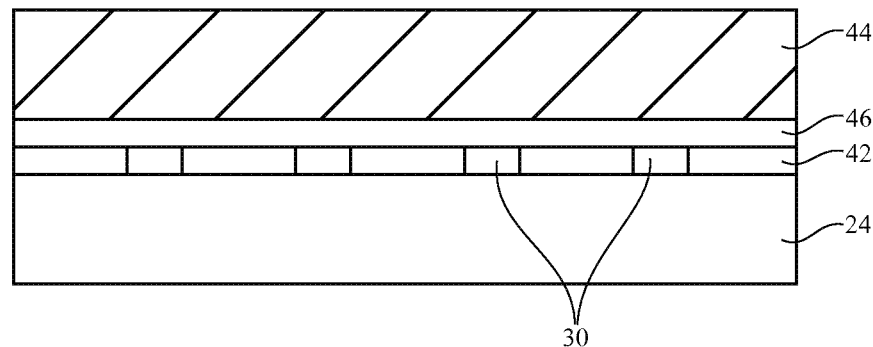
FIG. 6 is a cross-sectional side view of a display having an array of discrete light-emitting diodes covered with a transparent display cover layer in accordance with an embodiment.

If desired, filler material may be formed in the gaps between adjacent light-emitting diodes 30, as illustrated by filler material 42 of FIG. 5. Filler material 42 may be formed from a dielectric such as a polymer or other suitable material. FIG. 6 shows how additional layers may be attached to display 14 such as display cover layer 44. Display cover layer 44 may be a clear layer of plastic or glass (as examples). Filler material 42 (e.g., a polymer such as an adhesive) may be used in attaching display cover layer 44 to substrate 24 and/or additional layers of material such as illustrative adhesive layer 46 may be used in attaching display cover layer 44 to substrate 24.

Figure 7:
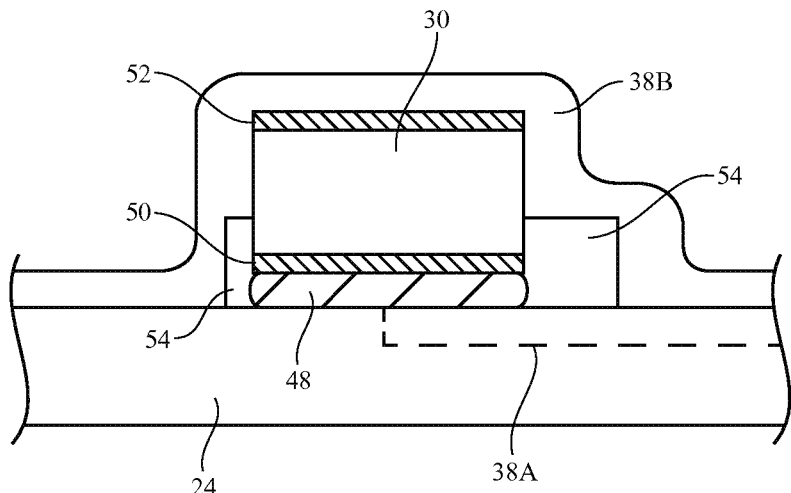
FIG. 7 is a cross-sectional side view of an illustrative discrete light-emitting diode mounted on a substrate with bonding material in accordance with an embodiment.

FIG. 7 is a cross-sectional side view of an illustrative light-emitting diode 30 that has been mounted to substrate 24 using bonding material 48 (e.g., conductive bonding material). Light-emitting diode 30 may have a cathode and anode (see, e.g., upper terminal 52 and lower terminal 50). Bonding material 48 may form an electrical path that shorts terminal 50 to signal path 38A of substrate 24. Upper signal path 38B may be formed from metal that overlaps upper terminal 52. Metal 38B and metal in signal line 38A may be isolated from each other using dielectric spacers 54 (as an example).

Figure 8:
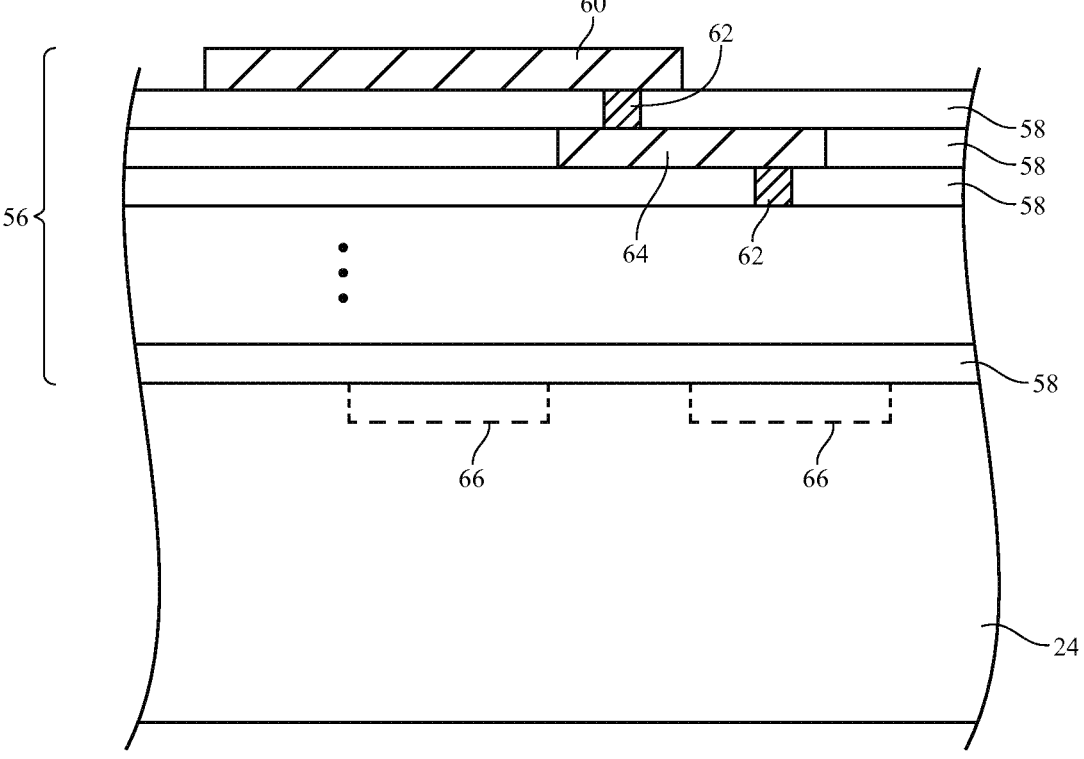
FIG. 8 is a cross-sectional side view of a portion of a substrate for a display in accordance with an embodiment.

FIG. 8 is a cross-sectional side view of substrate 24 in an illustrative configuration in which substrate 24 has a dielectric stack with interconnects (signal paths). As shown in FIG. 8, dielectric stack 56 may be formed from multiple dielectric layers 58 on the surface of substrate 24. Dielectric layers 58 may include metal interconnects (metal traces) such as contacts (e.g., pad 60), vias 62, and metal lines 64. The metal interconnects of dielectric stack 56 may form terminals for transistors and other circuitry 66 in substrate 24 (e.g., in a configuration in which substrate 24 is formed from a semiconductor such as silicon). Circuitry 66 may include metal-oxide-semiconductor transistors, diodes, photodetectors, and other circuitry. If desired, integrated circuits, other circuits, and other electronic components may be mounted on pads such as pad 60. For example, an integrated circuit or a discrete component may be soldered to pads 60 using solder.

Figure 9:
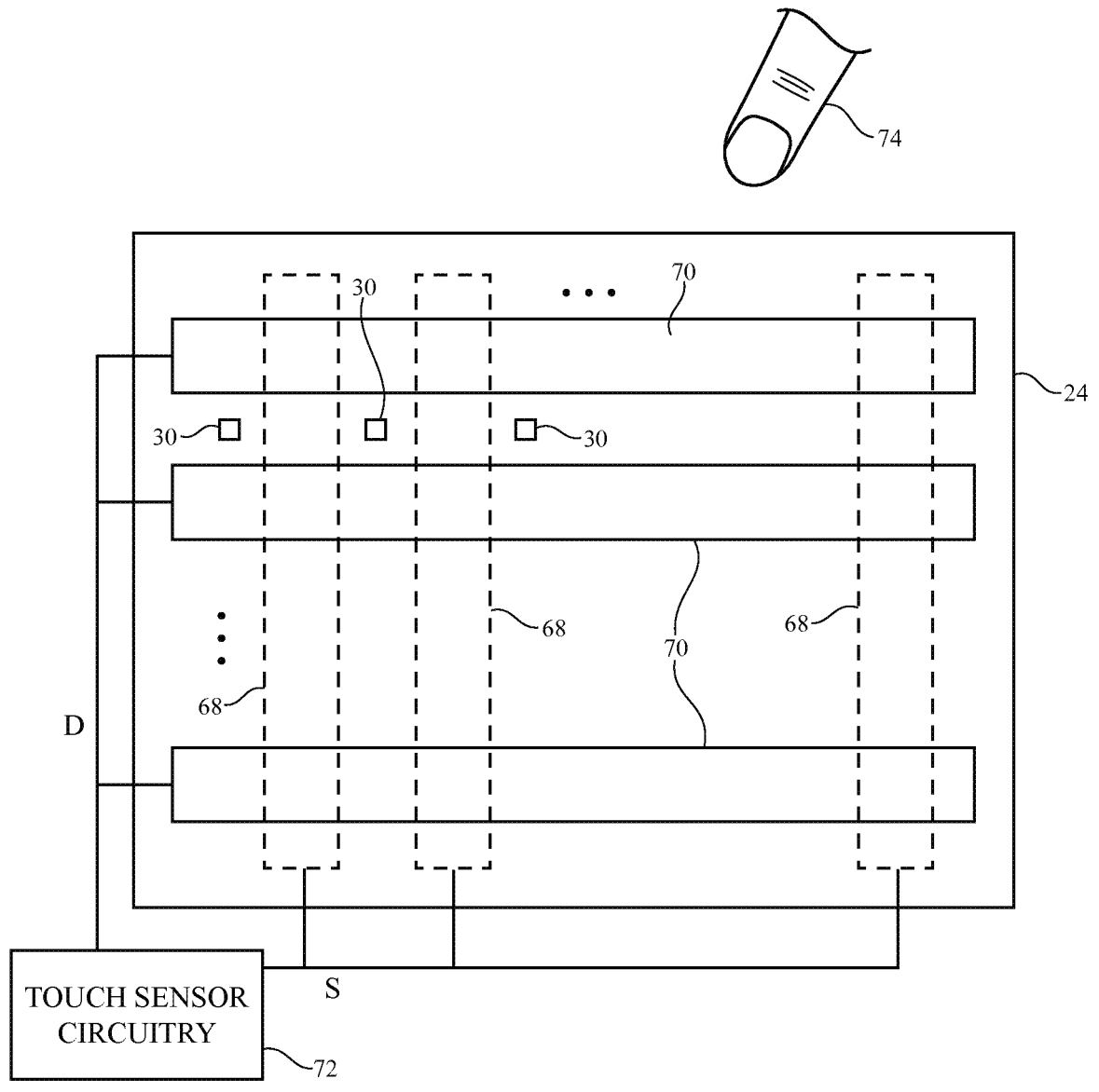
FIG. 9 is a top view of an illustrative touch sensor array within which an array of discrete light-emitting diodes for a display has been formed in accordance with an embodiment.

If desired, light-emitting diodes 30 may be interspersed among touch sensor structures. As shown in FIG. 9, for example, a capacitive touch sensor may be formed from capacitive touch sensor electrodes on substrate 24 such as horizontal electrodes 70 and vertical electrodes 68. Using touch sensor circuitry 72, drive signals D may be applied to horizontal electrodes 70 and corresponding sense signals S may be detected on electrodes 68. Touch sensor circuitry 72 may perform touch sensor signal processing operations that allow the touch sensor of FIG. 9 to determine the location of external objects touching the touch sensor (i.e., to locate an external object such as user finger 74 or a stylus). Electrodes 70 and 68 may be formed on the same surface of substrate 24 or may be formed on opposite sides of substrate 24. Touch sensor electrodes 68 and 70 may be used to gather touch input from one or more fingers or other external objects (e.g., gestures). The display pixel array formed from light-emitting diodes 30 may be used to display images for a user.

Figure 10:
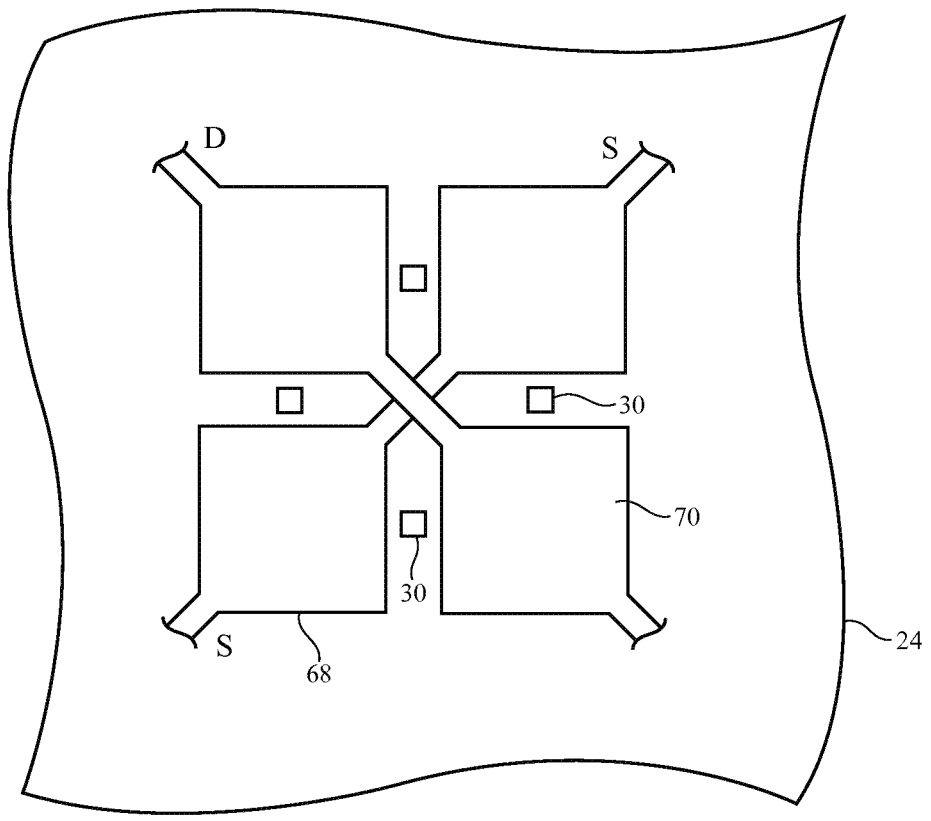
FIG. 10 is a top view of an illustrative touch sensor electrode pattern that may be used to accommodate an array of discrete light-emitting diodes in accordance with an embodiment.

The illustrative touch sensor configuration of FIG. 9 includes horizontal and vertical capacitive touch sensor electrodes formed in the spaces between light-emitting diodes 30. If desired, other touch sensor electrode patterns may be used (see, e.g., the diagonally coupled square pads of FIG. 10).

Figure 11:
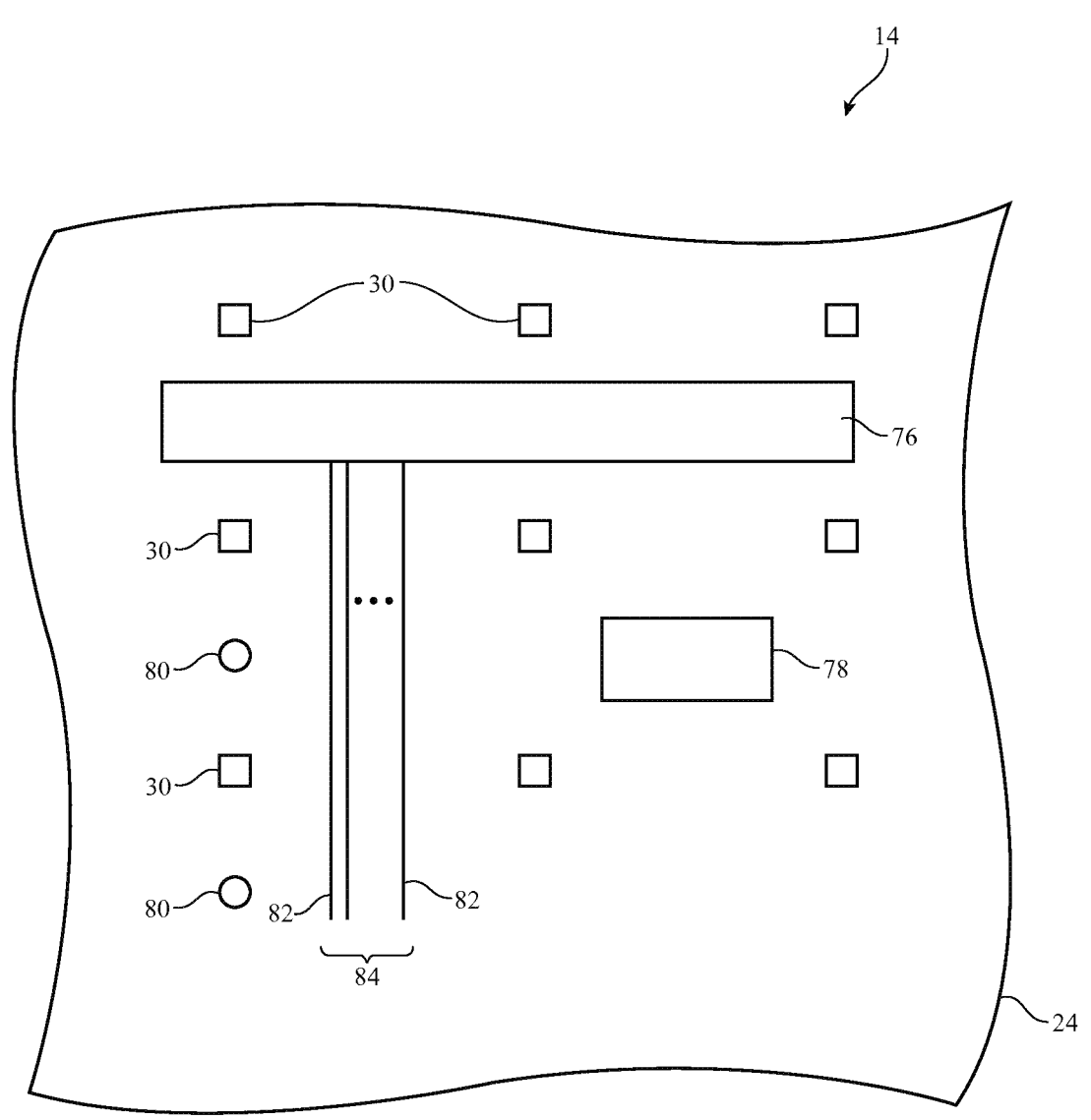
FIG. 11 is a top view of an illustrative display including an array of light-emitting diodes and other circuitry in spaces between the light-emitting diodes in accordance with an embodiment.

FIG. 11 is a top view of a portion of an illustrative display having an array of display pixels formed from light-emitting diodes 30 on substrate 24. As shown in the example of FIG. 11, one or more components may be interspersed in the spaces between respective light-emitting diodes 30. The components that are formed within the spaces between light-emitting diodes 30 may include components such as component 76, component 78, components 80 and conductive lines (signal paths) 82.

Components such as component 76 may be elongated component that are located in the channel-shaped spaces formed between respective rows or columns of light-emitting diodes. A component such as component 78 may have a smaller footprint that allows component 78 to fit within the space between light-emitting diodes without extending past multiple rows or columns of light-emitting diodes. Components such as components 80 may be formed in an array (e.g., a one-dimensional array such as a row or column, or a two-dimensional array that covers some or all of display 14).

Components such as components 76, 78, and 80 may be integrated circuits, discrete components such as capacitors, resistors, or inductors, light-emitting components (e.g., infrared light-emitting diodes, lasers, etc.), light detectors (e.g., photodetectors sensitive to visible and/or infrared light for forming an ambient light sensor or other detector), light-based proximity sensors (e.g., a light detector and photodetector for transmitting light and gathering reflected light), capacitive proximity sensors, electrodes and control circuitry for a touch sensor, force sensors (e.g., piezoelectric sensors, resistive force sensors, capacitive force sensors, etc.), Peltier effect heating and cooling elements, temperature sensors, resistance sensors, moisture detectors, strain gauges, pressure sensors, accelerometers and other microelectromechanical systems (MEMs) devices, switches, audio components such as microphones or sound producing structures, an array of light-emitting components that work with an array of light detectors for use in capturing three-dimensional scans of external objects, miniature integrated circuits (e.g., circuit die such as illustrative components 80 that have sizes comparable to light-emitting diodes 30 and that are optionally protected by one or more overlapping moisture barrier layers), miniature integrated circuits or other integrated circuit that have support communications using a one wire interface or other suitable communications interface, display driver circuitry (e.g., circuitry for performing signal demultiplexing and display pixel control operations), circuitry for touch sensing (e.g., drive and sense circuitry), circuitry for capturing capacitance signals from capacitive touch sensor electrodes to implement a fingerprint sensor (e.g., a capacitive fingerprint sensor), circuitry for capacitance sensing, force sensors and other circuitry for force sensing, etc. As an example, there may be numerous circuits 76 interspersed among an array of light-emitting diodes 30. Each circuit 76 may contain digital data communications circuitry for receiving display data from other display circuitry (see, e.g., circuitry 28 of FIG. 3). Each circuit 76 may also include display driver circuitry (e.g., pixel circuits) for controlling a subset of diodes 30 (e.g., 2-40 diodes 30, as an example) in the vicinity of that circuit 76. Circuits such as circuit 76 may also be located on the rear surface of substrate 24.

Signal paths such as lines 82 may be formed in one or more layers of dielectric stack 56 and may, if desired, be organized to form busses such as bus 84. Signal paths on substrate 24 may be coupled to solder pads on the upper surface of substrate 24 and/or on the opposing lower surface of substrate 24. Integrated circuits, discrete components, and other circuit components may be soldered to the solder pads using solder. To enhance the signal carrying capacity of bus 84, signals may be multiplexed using time division multiplexing and/or frequency multiplexing.

Figure 12:
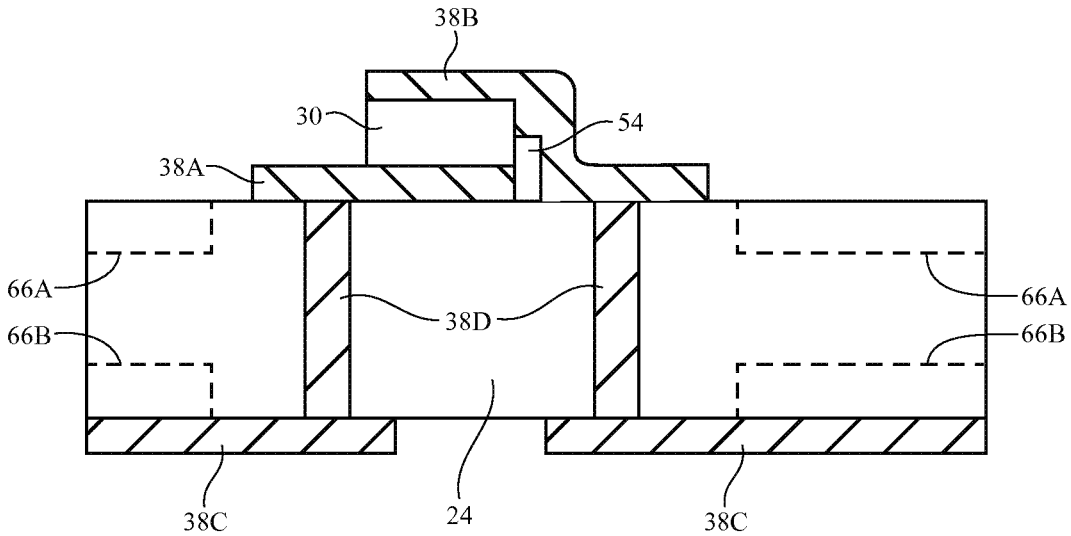
FIG. 12 is a cross-sectional side view of an illustrative light-emitting diode mounted on a silicon display substrate having through-silicon vias in accordance with an embodiment.

It may be desirable to form interconnects and/or other circuitry on the lower surface of substrate 24. As shown in FIG. 12, for example, substrate 24 may have circuitry such as upper surface circuitry 66A and lower surface circuitry 66B. Through-silicon vias 38D may be used in coupling light-emitting diode 30 for display pixel 22 to circuitry 66B. Light-emitting diode 30 and, if desired, circuitry 66B, may also be coupled to circuitry 66A (e.g., using traces on the upper and/or lower surfaces of substrate 24 and using through-silicon vias 38D).

Through-silicon vias 38D may have diameters of 20-30 microns, 5-40 microns, more than 15 microns, or less than 50 microns (as examples). As shown in FIG. 12, paths 38A and 38B may be used in coupling the terminals of light-emitting diode 30 to respective vias 38D and corresponding signal paths 38C on the lower surface of substrate 24. With one suitable arrangement, a first of vias 38D is a source line (data line) via carrying data signals D and a second of vias 38D is a gate line carrying gate line signals G. Circuitry 66A and/or circuitry 66B may be used in forming display driver circuitry such as circuitry 18, 20, and 28 of FIG. 3. Borderless configurations or nearly borderless configuration may be formed for display 14 by placing display driver circuitry on the backside of substrate 24 or otherwise reducing display driver circuitry in inactive border regions of substrate 24. Circuitry 66A and/or circuitry 66B may also be used in forming touch sensor circuitry 72 (FIG. 9), circuitry such as circuitry 76, 78, and 80 of FIG. 11, circuitry 16 of FIG. 2, and circuitry for devices 17 of FIG. 2 (as examples).

Figure 13:
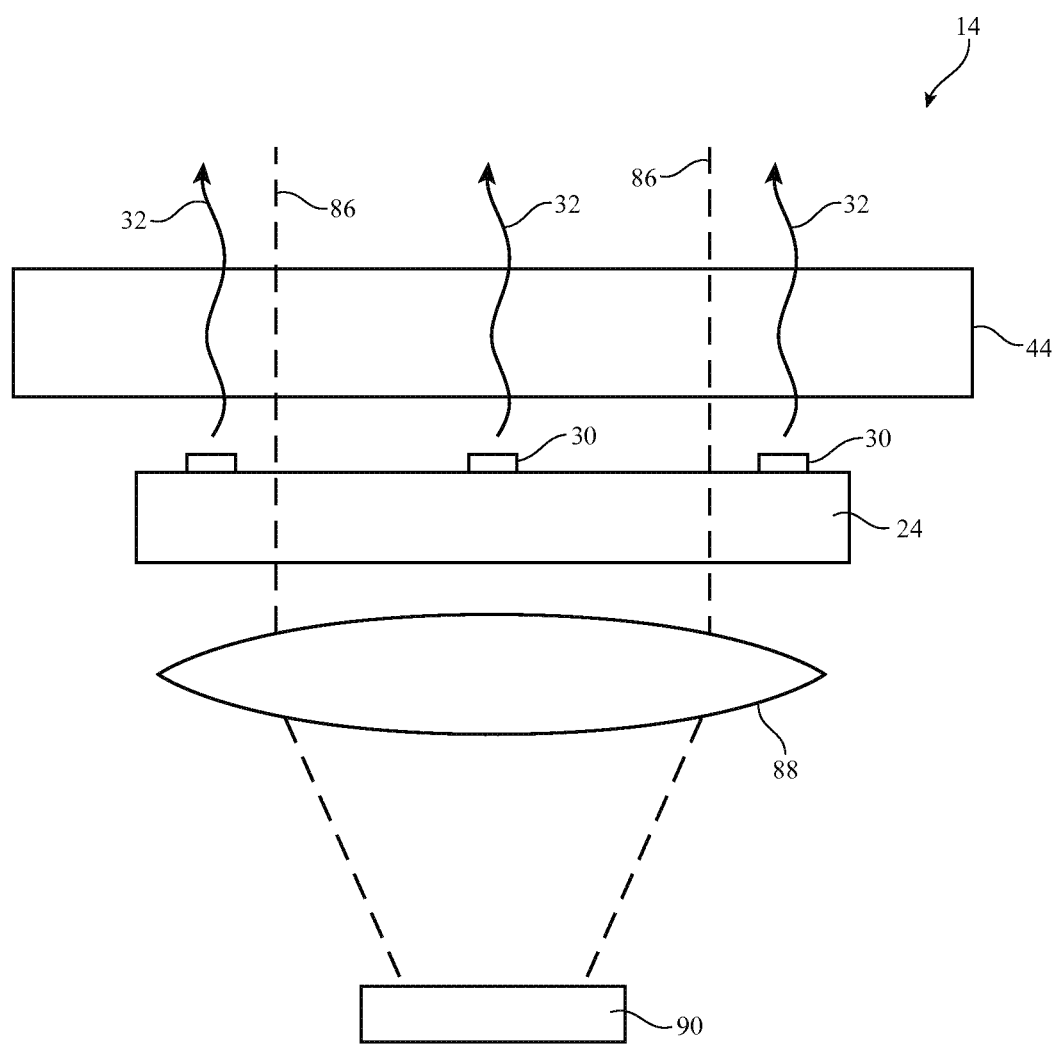
FIG. 13 is a cross-sectional side view of a display system having a substrate with an array of light-emitting diodes and an image sensor that captures images through the substrate in accordance with an embodiment.

FIG. 13 is a cross-sectional side view of display 14 in a configuration in which substrate 24 has been formed from a transparent material such as clear glass, clear plastic, or other clear dielectric. Display cover layer 44 may serve as a protective outer layer for display 14. During operation, an array of display pixels formed from light-emitting diodes 30 may be used to emit light 32 to form images for a user of device 10. Image sensor 90 and lens 88 may be mounted within device 10 in alignment with display substrate 24. Display cover layer 44 and display substrate 24 are clear (in the example of FIG. 13), which allows image light 86 from an external object on the exterior of device 10 to pass through layer 44 and substrate 24. Light 86 that has passed through layer 44 and substrate 24 may then be focused onto image sensor 90 by lens 88. Image sensor 90 may convert the incoming light 86 into a digital image for processing by the control circuitry of device 10. If desired, a circular polarizer may be incorporated into display 14 to suppress reflections from light-emitting diodes 30 and other circuit components on the surface of substrate 24.

Figure 14:
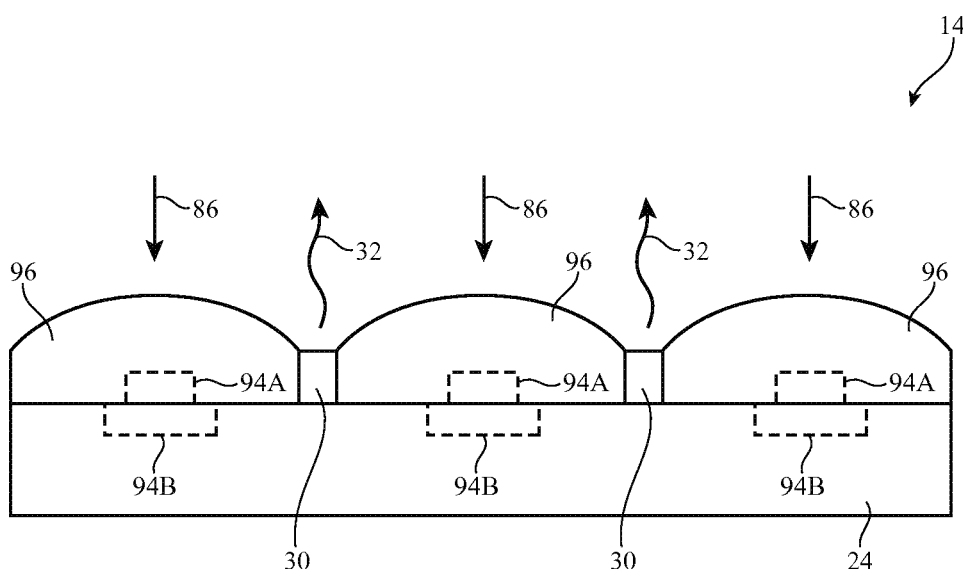
FIG. 14 is a cross-sectional side view of an illustrative display having an array of light-emitting diodes and interspersed microlenses and light detectors in accordance with an embodiment.

FIG. 14 is a cross-sectional side view of display 14 in a configuration in which a light sensor array is formed on the upper surface of substrate 24 (e.g., a silicon substrate). The light detectors may be located in the spaces between respective light-emitting diodes 30 and may be formed from discrete components mounted to the upper surface of substrate 24 (see, e.g., light detectors 94A) or may be formed from light sensor circuitry embedded within substrate 24 (see, e.g., light detectors 94B). Microlenses 96 (e.g., polymer microlenses or microlenses formed from other clear material) may be used to direct incoming image light 86 onto respective light detectors 94A or 94B. To avoid interference between the display pixels formed from light-emitting diodes 30 and the array of light detectors, light 32 may be emitted from light-emitting diodes 30 during time periods when light detectors 94A or 94B are not actively acquiring light and light detectors 94A and 94B may be used to gather light readings when light-emitting diodes 30 are not actively emitting light. The array of light detectors of FIG. 14 may be used in gathering touch data, may form part of a camera, may be used to gather ambient light sensor readings, may be used as part of a proximity sensor, or may be used for other operations within device 10.

In configurations for display 14 that include an array of light detectors for gathering images, the light detectors may be used to form a front-facing camera in device 10. Light detectors such as an image sensor or an array of detectors such as detectors 94A and 94B may also be used to implement a three-dimensional scanning system in which light from light-emitting diodes 30 and/or other light-emitting diodes in display 14 is emitted in a known pattern (e.g., a pattern of scan lines or other suitable pattern) and is subsequently reflected from an object. The reflected light may be captured using the image sensor or array of light detectors to acquire three-dimensional scans of people or other external objects. Light-emitting diodes 30 may also be used as light emitters in a light-based proximity sensor where light detectors 94 are used to detect reflected emitted light or in other light-based components for device 10. If desired, light detectors 94A or 94B may be used as ambient light sensors or as detectors in an optical fingerprint sensor device (e.g., a device in which light-emitting diodes 30 or other light emitters emit light that is reflected from a finger).

Figure 15:
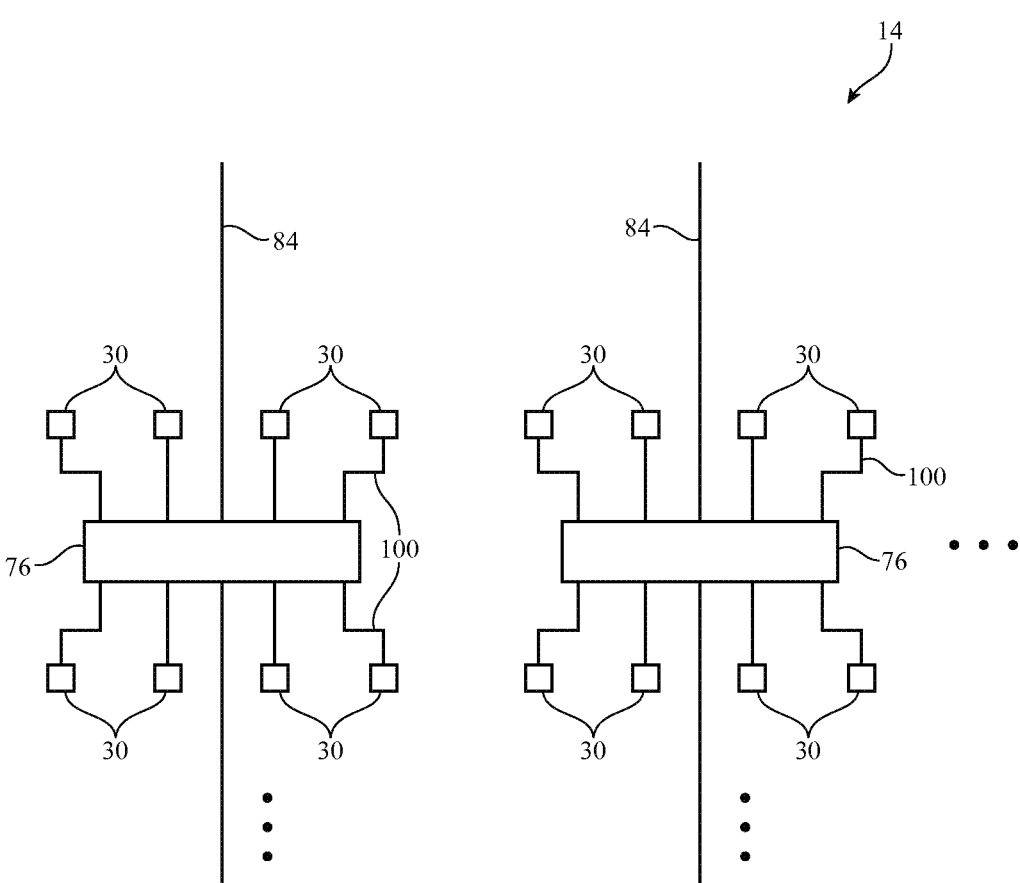
FIG. 15 is a top view of an illustrative display showing how circuits may receive digital display data on one or more global data paths and may control an associated local set of light-emitting diodes using local control paths in accordance with an embodiment.

If desired, display drive circuits such as pixel driver circuits for controlling the operation of light-emitting diodes 30 may incorporated into display 14 (see, e.g., circuits 76 of FIG. 11). An illustrative configuration for display 14 in which driver circuits 76 have been interspersed in gaps between light-emitting diodes 30 is shown in FIG. 15. Data paths 84 (e.g., high speed horizontal and/or vertical data paths that carry display data on one or more signal lines) may be used to supply image data to an array of pixel (display) driver circuits 76. Each driver circuit 76 may supply corresponding control signals to a set of associated light-emitting diodes 30 (e.g., 2 or more 5 or more 10 or more, 2-40, 5-30, or other suitable number of diodes 30). Local signal lines 100 may be used in supplying control signals to the set of light-emitting diodes 30 controlled by a given one of driver circuits 76. Paths 84 and/or local paths 100 may be implemented using metal interconnect lines such as metal lines in dielectric stack 56 of FIG. 8. If desired, stack 56 may have five metal layers. The upper two metal layers may be used for implementing touch sensor electrodes 68 and 70 and the lower three metal layers may be used for implementing paths such as paths 84 and 100. If desired, circuits such as the display driver circuitry of circuits 76 of FIG. 15 may be mounted on the underside of substrate 24 and through-substrate vias may be used to route signals to an array of light-emitting diodes 30 on the upper surface (i.e., the front side) of substrate 24.

Figure 16:
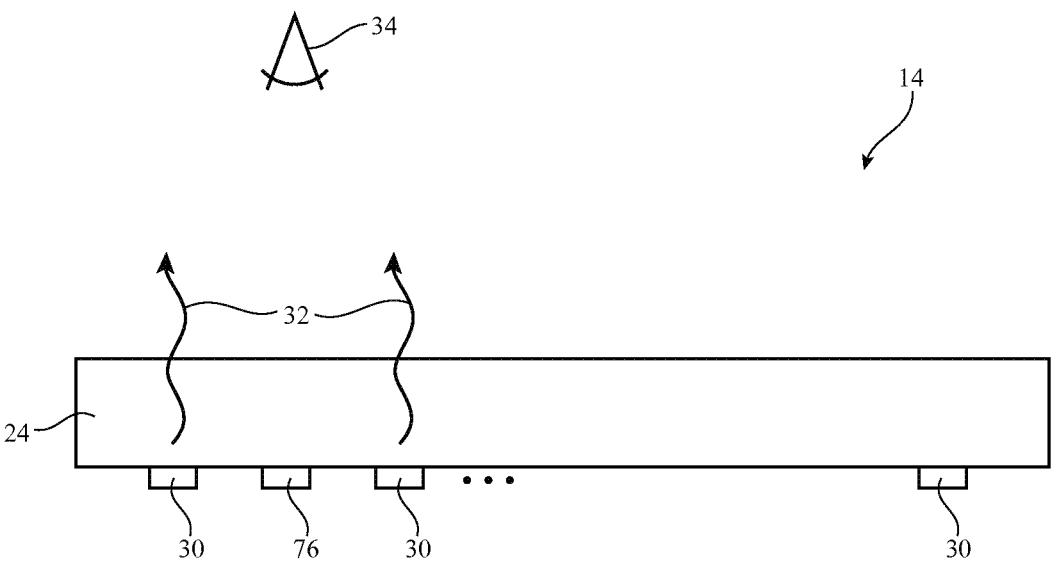
FIG. 16 is a cross-sectional side view of an illustrative display having a transparent substrate and an array of components mounted on the underside of the transparent substrate in accordance with an embodiment.

If desired, substrate 24 may be formed from sapphire, clear glass, clear polymer, or other transparent materials. In situations in which substrate 24 is transparent, light-emitting diodes 30 may be mounted on the underside of substrate 24. As shown in the illustrative cross-sectional side view of FIG. 16, an array of light-emitting diodes 30 and optional components 76 (e.g., pixel driver circuits, etc.) may be mounted on the underside of transparent substrate 24. During operation, light-emitting diodes 30 may produce light 32 that travels outward to user 34 through substrate 24. Substrate 24 may be formed from a material that is sufficiently durable to resist scratching and damage from contact with external objects (i.e., display cover layer 44 may be omitted as shown in FIG. 16) or display cover layer 44 may be attached over the front of substrate 24 (e.g., using clear adhesive).

Figure 17:
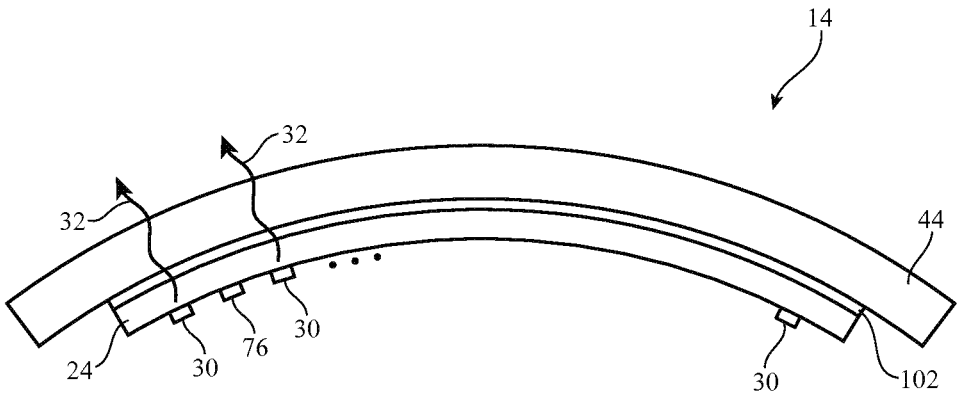
FIG. 17 is a cross-sectional side view of a curved display having an array of light-emitting diodes mounted on the underside of a flexible substrate in accordance with an embodiment.
Figure 18:
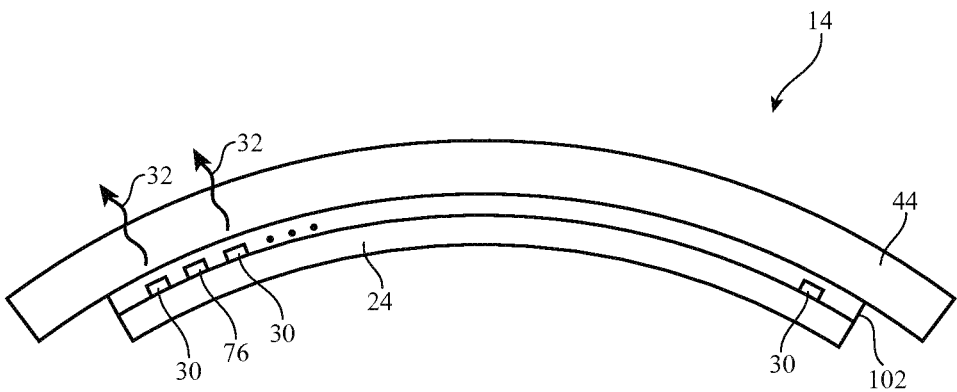
FIG. 18 is a cross-sectional side view of a curved display having an array of light-emitting diodes mounted on the upper surface of a flexible substrate in accordance with an embodiment.

The cross-sectional side views of display 14 that are shown in FIGS. 17 and 18 illustrate how substrate 24 may be formed from a flexible material (e.g., polyimide or other flexible polymer, etc.). This allows display 14 to have a concave or convex outer surface. In the example of FIG. 17, display cover layer 44 has a convex shape and flexible display substrate 24 has been bent to conform to the curved inner surface of display cover layer 44. Clear adhesive 102 may be used in attaching flexible substrate layer 24 to display cover layer 44. Display cover layer 44 may be formed from a material such as sapphire, glass, plastic, or other rigid materials (as examples).

In the FIG. 17 example, light-emitting diodes 30 have been mounted on the underside of substrate 24. Circuits 76 (e.g., integrated circuits such as pixel driver circuits for controlling associated light-emitting diodes 30, sensors, other electrical components, etc.) may be mounted to substrate 24 in spaces between light-emitting diodes. With the configuration of FIG. 17 flexible substrate 24 may be a clear flexible substrate (e.g., a substrate of polyimide or other clear polymer), so that light 32 passes through clear flexible substrate 24 and passes through clear display cover layer 44. In the FIG. 18 example, light-emitting diodes 30 have been formed on the upper surface of substrate 24 and clear layer 102 (e.g., a clear layer of adhesive) has been used to mount substrate 24 to the underside of display cover layer 44. With this configuration, light passes through layer 102 and clear display cover layer 44, but does not pass through substrate layer 24. In the configuration of FIG. 18, substrate 24 is preferably sufficiently flexible to conform to the curved inner surface of display cover layer 44, but need not be transparent.

The foregoing is merely illustrative and various modifications can be made by those skilled in the art without departing from the scope and spirit of the described embodiments. The foregoing embodiments may be implemented individually or in any combination.

What is claimed is:

1. A display, comprising:
a substrate;
an array of light-emitting diode pixels on the substrate; and
an ambient light sensor mounted behind the array of light-emitting diode pixels and configured to detect ambient light while the light-emitting diode pixels are not actively emitting light, wherein the ambient light sensor comprises an array of light detectors and microlenses configured to focus the ambient light onto the respective light detectors.

2. The display defined in claim 1 wherein the array of light-emitting diode pixels is configured to emit display light when the light detectors are not actively measuring the ambient light.

3. The display defined in claim 1 wherein the microlenses comprise polymer microlenses that are aligned with respective gaps between the light-emitting diode pixels.

4. The display defined in claim 1 wherein at least part of the substrate is curved.

5. The display defined in claim 1 wherein the substrate comprises flexible polyimide.

6. An electronic device, comprising:
a bent polymer substrate;
an array of display pixels on the bent polymer substrate and configured to emit display light; and
an optical sensor behind the array of pixels and configured to gather ambient light measurements while the array of display pixels is not emitting the display light, wherein the optical sensor comprises light detectors each covered by a respective microlens.

7. The electronic device defined in claim 6 wherein the display pixels comprise discrete crystalline semiconductor light-emitting diodes.

8. The electronic device defined in claim 7 wherein the discrete crystalline semiconductor light-emitting diodes are soldered to the bent polymer substrate.

9. The electronic device defined in claim 6 wherein the bent polymer substrate is transparent.

10. The electronic device defined in claim 6 wherein the bent polymer substrate comprises flexible polyimide.

11. The electronic device defined in claim 6 further comprising a display cover glass overlapping the array of display pixels, wherein at least part of the display cover glass is curved.

12. An electronic device, comprising:
a substrate;
an array of light-emitting diode pixels on the substrate, wherein the light-emitting diode pixels are separated by gaps and are configured to emit display light; and
a light sensor configured to detect light that passes through the gaps without detecting the display light, wherein the light sensor comprises microlenses and an array of light detectors.

13. The electronic device defined in claim 12 wherein the light-emitting diode pixels comprise discrete crystalline semiconductor light-emitting diodes.

14. The electronic device defined in claim 12 wherein the substrate comprises a flexible polymer substrate.

15. The electronic device defined in claim 12 wherein the substrate comprises polyimide.

16. The electronic device defined in claim 12 further comprising a display cover layer overlapping the array of light-emitting diode pixels, wherein at least part of the display cover layer is curved.

17. The electronic device defined in claim 12 wherein at least part of the substrate is curved.

18. The electronic device defined in claim 12 further comprising a display driver integrated circuit die soldered to the substrate.

19. The electronic device defined in claim 12 wherein the light sensor comprises an ambient light sensor.

20. The electronic device defined in claim 19 wherein the microlenses are each aligned with a respective one of the gaps.

* * * * *